US005840187A

United States Patent [19]

Derenthal et al.

[11] Patent Number: 5,840,187

[45] Date of Patent: Nov. 24, 1998

[54] DEVICE FOR FILTERING, WASHING AND DRYING A SOLID MATERIAL-LIQUID MIXTURE

[75] Inventors: Ulrich Derenthal, Roxheim, Germany; Karel Antoon Thissen, Utrecht, Netherlands

[73] Assignee: Pannevis B. V., Utrecht, Netherlands

[21] Appl. No.: 768,953

[22] Filed: Dec. 18, 1996

[30] Foreign Application Priority Data

Dec. 21, 1995 [NL] Netherlands ........................... 1001970

[51] Int. Cl.[6] ............................ C02F 11/12; B01D 33/04; F26B 17/04; F26B 19/00

[52] U.S. Cl. .......................... 210/400; 210/401; 210/406; 210/770; 210/771; 210/772; 210/783; 34/266; 34/267; 34/268; 34/269; 34/274; 34/69

[58] Field of Search .................................... 210/400, 406, 210/401, 770, 771, 772, 783; 34/266, 267, 268, 269, 274, 69

[56] References Cited

U.S. PATENT DOCUMENTS

| | | |
|---|---|---|
| 4,038,193 | 7/1977 | van Oosten . |
| 4,813,153 | 3/1989 | Palmer et al. . |
| 4,979,315 | 12/1990 | Pievson . |
| 5,233,763 | 8/1993 | Minnie, Jr. . |
| 5,375,344 | 12/1994 | Ruefli . |
| 5,527,458 | 6/1996 | Gehrmann . |
| 5,678,323 | 10/1997 | Dominque . |

FOREIGN PATENT DOCUMENTS

| | | |
|---|---|---|
| 0213855 | 3/1987 | European Pat. Off. . |
| 947650 | 7/1949 | France . |
| 1051766 | 1/1954 | France . |
| 2047396 | 11/1980 | United Kingdom . |

*Primary Examiner*—Thomas M. Lithgow
*Attorney, Agent, or Firm*—Webb Ziesenheim Bruening Logsdon Orkin & Hanson, P.C.

[57] ABSTRACT

In a device for filtering, washing and drying a solid material-liquid mixture, using a liquid permeable filter cloth the mixture is first subjected to a pressure difference above and below the filter cloth, whereafter liquid is supplied to the mixture. The mixture present above the filter cloth is then dried according to the invention using radiation sources, the radiation from which has differing, preferably increasing, wavelengths in the processing direction. The wavelength lies in the infrared range. The applied wavelength is chosen subject to the product for filtering.

20 Claims, 2 Drawing Sheets

DEVICE FOR FILTERING, WASHING AND DRYING A SOLID MATERIAL-LIQUID MIXTURE

BACKGROUND OF THE INVENTION

1. Field of the Invention

The invention relates to a device for filtering, washing and drying a solid material-liquid mixture, having a circulating, liquid permeable filter cloth and successively as seen in the processing direction means for feeding the mixture to the filter cloth, means for generating a pressure difference such that the pressure above the filter cloth is higher than that below the filter cloth, means for supplying liquid to the mixture on the filter cloth, means for collecting filtrate and means placed above the filter cloth for drying the mixture. Such a device is known from US-A-4038193.

2. Description of the Prior Art

In a continuously operating device for filtering, washing and drying a solid material-liquid mixture all three processes, i.e. filtering, washing and drying, are performed in one process run. By means of the means for feeding the solid material-liquid mixture an even layer of the mixture is supplied to the filter cloth.

A filtrate is separated and collected as a result of the pressure difference. Liquid is supplied to the mixture by means of the means for applying liquid. As a result of the lower pressure under the filter cloth the liquid is separated out through the mixture layer and collected as filtrate.

Finally, the remaining solid material-liquid mixture is dried by supplying heat in order to increase the quantity of solid material relative to the total mass. The dried mixture remains behind on the filter cloth.

It is the object of the invention to optimize the drying process.

SUMMARY OF THE INVENTION

The drying process is optimized according to the invention in that the means for drying consist of radiation sources, the radiation from which has a differing wavelength as seen in the processing direction.

It has been found that with the use of infrared radiation, wherein different wavelengths are chosen, the drying process is considerably improved.

Particularly in the case of a device of the present type wherein the solid material-liquid mixture for filtering, washing and drying is arranged as an even layer on the filter cloth, the supply of heat by means of radiation is eminently suitable for the drying.

In preference the wavelength increases as seen in the processing direction such that at the beginning of the drying process radiation takes place at short wavelength, wherein a long wavelength is applied during the further progression.

The radiation at different wavelengths can be obtained in simple manner in that according to the invention radiation sources consist of infrared radiators and plates with differing degrees of blackening placed in the radiation path. As a result of the different blackening the plates will radiate infrared with differing wavelength depending on the blackening.

The invention will be further elucidated with reference to the annexed drawings of embodiments.

DETAILED DESCRIPTION OF THE EMBODIMENT

Figure 1:
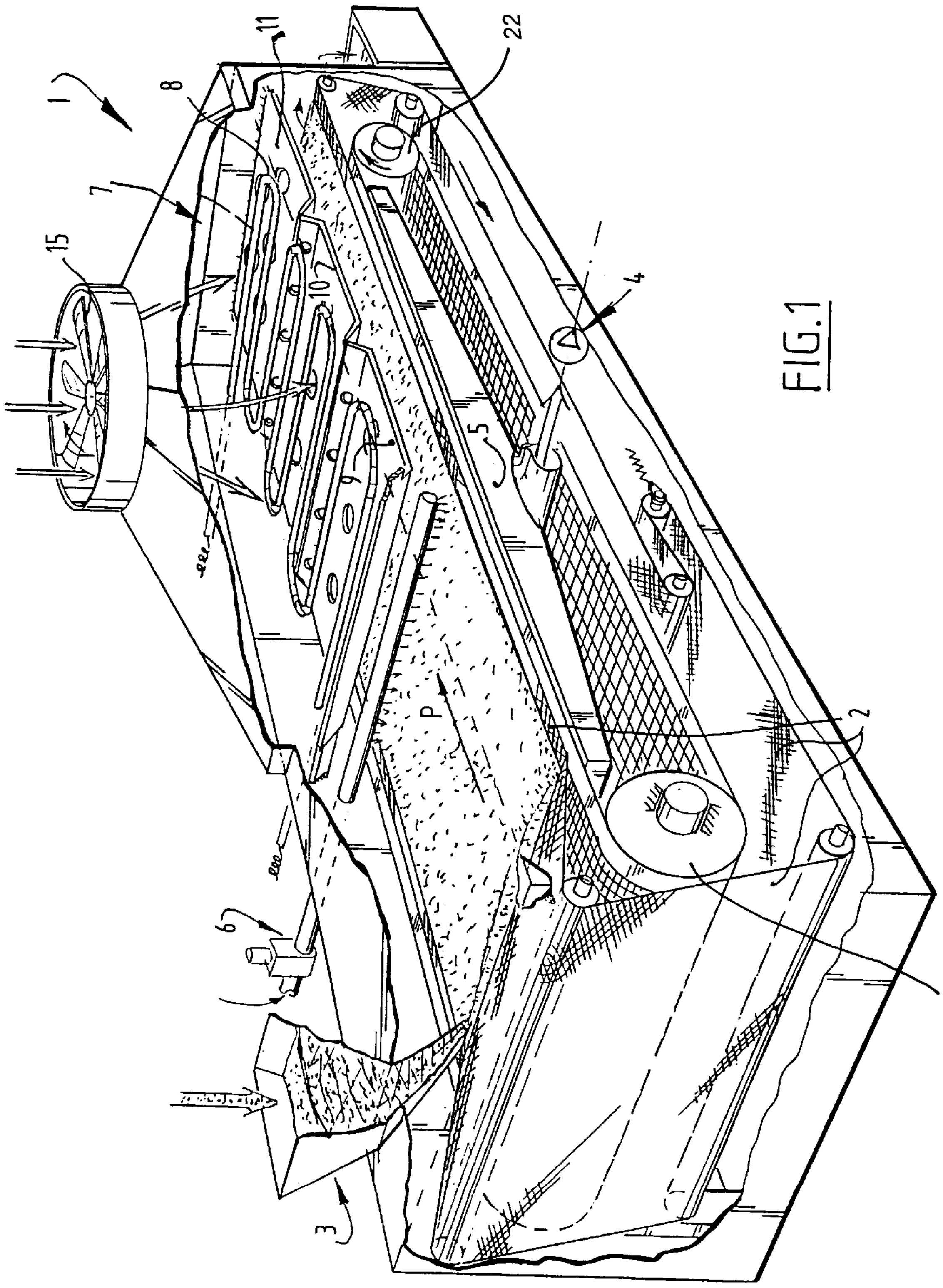
FIG. 1 shows a perspective view of a first embodiment of the invention.

The device 1 consists of an endless, circulating filter cloth 2 which includes rollers 20 and 22 which form a means for circulating the filter cloth 2 in the processing direction P.

In the processing direction as according to arrow P means 3 for supplying a solid material-liquid mixture for filtering, washing and drying are placed on filter cloth 2 at the beginning of the process. The supply means ensure that an even layer of the mixture is applied on filter cloth 2. Arranged under filter cloth 2 are means 4 for generating underpressure. Due to the underpressure the liquid will be drawn through filter cloth 2. The liquid is collected in a reservoir 5. Means 6 for supplying liquid to the mixture are arranged above filter cloth 2. As seen in the processing direction, means 7 for drying the mixture are placed thereafter above filter cloth 2.

According to the invention the means for drying consist of radiation sources 8. Plates 9,10,11 with different blackening are placed in the radiation path. Despite the fact that the infrared radiators can be of the same type, a different radiation pattern is obtained as seen in the process direction because the plates emit rays of different wavelength due to the different degrees of blackening.

Figure 2:
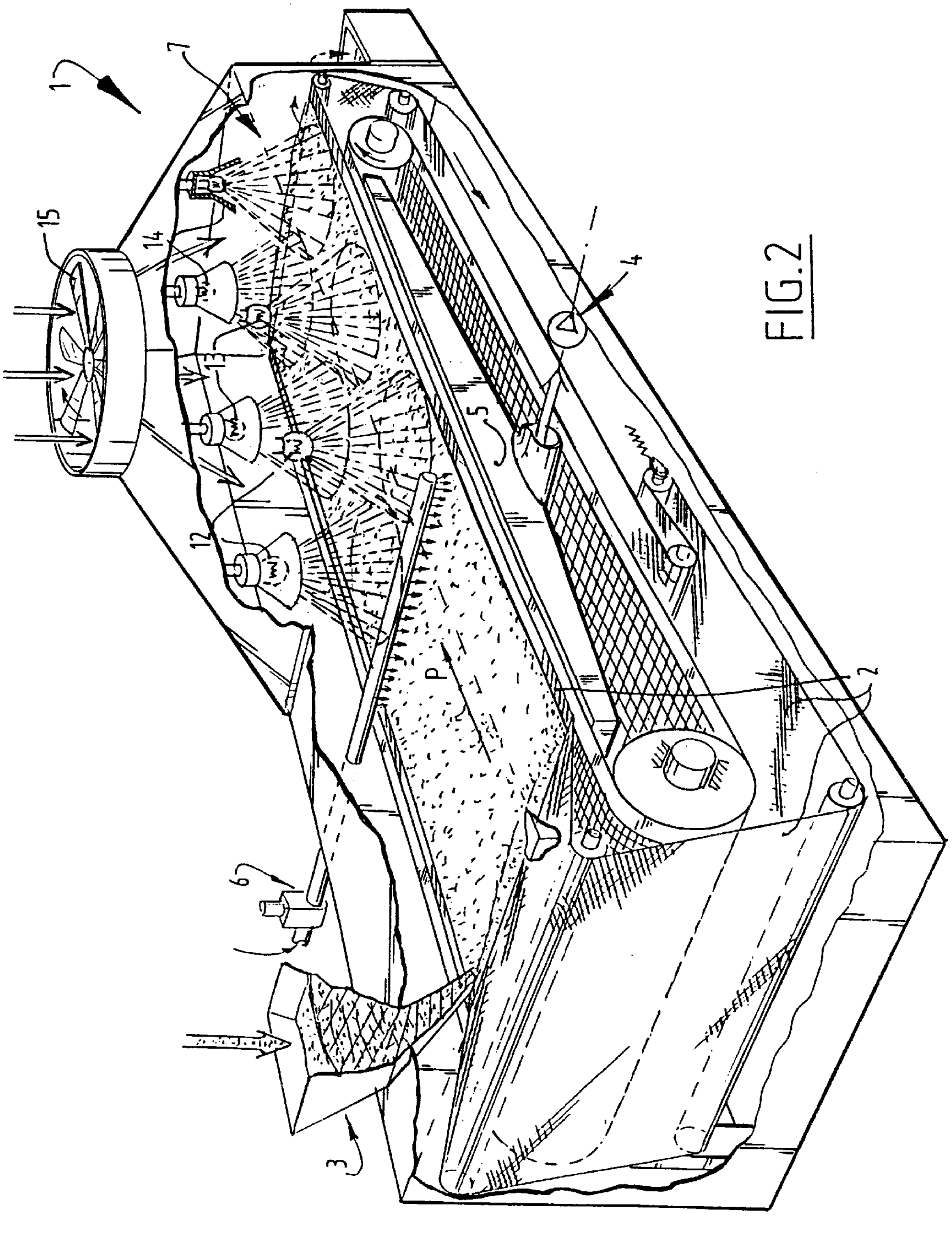
FIG. 2 shows a second embodiment of the invention.

The embodiment of FIG. 2 differs from that of FIG. 1 in that infrared radiation sources 12, 13, 14 are chosen as radiation sources. As in the embodiment of FIG. 1 the wavelengths of the radiation emitted by radiation sources 12, 13, 14 differ in lengthwise direction of the belt, for instance due to the choice of the type of radiation or by modifying the power supply of the radiators.

It is further noted that an optimum wavelength is chosen subject to the product for filtering.

Arranged above the filter belt are means 15 for generating hot air flows directed from above the filter cloth to the underside. These hot air flows remove the liquid vapour in forced manner, thus enhancing the drying process.

We claim:

1. A device for filtering, washing and drying a solid material-liquid mixture, comprising:

a liquid permeable filter cloth;

means for circulating the filter cloth in a process direction;

means for feeding the mixture to the filter cloth;

means for generating a pressure difference such that the pressure above the filter cloth is greater than the pressure below the filter cloth;

means for supplying liquid to the mixture on the filter cloth;

means for collecting filtrate; and means placed above the filter cloth for drying the mixture, wherein the means for drying includes at least one radiation source and at least one plate placed between the at least one radiation source and the mixture on the filter cloth, with the at least one plate configured to absorb radiation from the at least one radiation source and emit radiation of a wavelength which is a function of the degree of blackening.

2. The device as claimed in claim 1, wherein the wavelength emitted by the at least one plate increases in the processing direction.

3. The device as claimed in claim 1, wherein the wavelength emitted by the at least one radiation source and the at least one plate lies in the infrared range.

4. The device as claimed in claim 1, wherein the at least one radiation source is a plurality of infrared radiators and the at least one plate includes a plurality of plates with differing degrees of blackening placed in the radiation path.

5. The device as claimed in claim 4, wherein the degree of blackening of the plates decreases in the process direction such that the wavelength emitted from the plates increases in the process direction.

6. The device as claimed in claim 1, further including means for generating a flow of hot air directed from above the filter cloth to below the filter cloth.

7. The device as claimed in claim 1, wherein the at least one radiation source is a plurality of infrared radiators.

8. The device as claimed in claim 2, wherein the wavelength emitted by the at least one radiation source and the at least one plate lies in the infrared range.

9. The device as claimed in claim 2, wherein the at least one radiation source is a plurality of infrared radiators and the at least one plate is a plurality of plates with differing degrees of blackening placed in the radiation path.

10. The device as claimed in claim 3, wherein the at least one radiation source is a plurality of infrared radiators and the at least one plate is a plurality of plates with differing degrees of blackening placed in the radiation path.

11. The device as claimed in claim 2, further including means for generating a flow of hot air directed from above the filter cloth to below the filter cloth.

12. The device as claimed in claim 3, further including means for generating a flow of hot air directed from above the filter cloth to below the filter cloth.

13. The device as claimed in claim 4, further including means for generating a flow of hot air directed from above the filter cloth to below the filter cloth.

14. The device as claimed in claim 5, further including means for generating a flow of hot air directed from above the filter cloth to below the filter cloth.

15. A device for filtering, washing and drying a solid material-liquid mixture, comprising:

a liquid permeable filter cloth;

means for circulating the filter cloth in a process direction;

means for feeding the mixture to the filter cloth;

means for generating a pressure difference such that the pressure above the filter cloth is greater than the pressure below the filter cloth;

means for supplying liquid to the mixture on the filter cloth;

means for collecting filtrate; and means placed above the filter cloth for drying the mixture, wherein the means for drying includes at least one radiation source and at least one plate having a differing degree of blackening in the process direction, the at least one plate placed between the at least one radiation source and the mixture on the filter cloth, with the at least one plate configured to absorb radiation from the at least one radiation source and emit radiation of a wavelength which is a function of its degree of blackening.

16. The device as claimed in claim 15, wherein the at least one radiation source is a plurality of infrared radiators.

17. The device as claimed in claim 15, wherein the wavelength emitted by the at least one plate increase in the processing direction.

18. The device as claimed in claim 15, wherein the wavelength emitted by the at least one radiation source and the at least one plate lies in the infrared range.

19. The device as claimed in claim 15, wherein the degree of blackening of the plates decreases in the process direction such that the wavelength emitted by the plates increases in the process direction.

20. The device as claimed in claim 15, further including means for generating a flow of hot air from above the filter cloth to below the filter cloth.

* * * * *